United States Patent
Atikoglu et al.

(10) Patent No.: US 10,504,089 B2
(45) Date of Patent: Dec. 10, 2019

(54) SYSTEM AND METHOD FOR MOBILE CHECKOUT

(71) Applicant: Wal-Mart Stores, Inc., Bentonville, AR (US)

(72) Inventors: Berk Atikoglu, San Francisco, CA (US); Eytan Daniyalzade, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 663 days.

(21) Appl. No.: 14/656,455

(22) Filed: Mar. 12, 2015

(65) Prior Publication Data

US 2016/0267454 A1 Sep. 15, 2016

(51) Int. Cl.
*G06Q 40/00* (2012.01)
*G06Q 20/20* (2012.01)
*G06Q 30/02* (2012.01)

(52) U.S. Cl.
CPC ......... *G06Q 20/202* (2013.01); *G06Q 20/201* (2013.01); *G06Q 20/207* (2013.01); *G06Q 30/0255* (2013.01); *G06Q 30/0267* (2013.01)

(58) Field of Classification Search
USPC .................................. 705/35–44, 26.1, 14.24
See application file for complete search history.

(56) References Cited

U.S. PATENT DOCUMENTS

| | | |
|---|---|---|
| 6,571,279 B1 | 5/2003 | Herz et al. |
| 6,845,400 B2 | 1/2005 | Macpherson et al. |
| 8,073,972 B2 | 12/2011 | Jansen et al. |
| 8,341,465 B2 | 12/2012 | Bravery et al. |
| 8,457,653 B2 | 6/2013 | Ledlie |
| 8,645,501 B2 | 2/2014 | Ghosh et al. |
| 8,689,280 B2 | 4/2014 | Spektor et al. |
| 8,769,118 B2 | 7/2014 | Raciborski et al. |
| 2003/0023483 A1* | 1/2003 | Messner ............ G06Q 10/0637 705/14.24 |

(Continued)

OTHER PUBLICATIONS

Grocery Comparison Site mySupermarket Launches U.S. Megastore... https://techcrunch.com/.../grocery-comparison-site-mysupermarket-launches-u-s-mega...Jun 10, 2013—(Year: 2013).*

(Continued)

*Primary Examiner* — Hani M Kazimi
*Assistant Examiner* — Hatem M Ali
(74) *Attorney, Agent, or Firm* — Bryan Cave Leighton Paisner LLP

(57) ABSTRACT

In some embodiments, a method can comprise receiving a request from a client device to join a wireless local area network in a store, allowing the client device to connect to a router of the wireless local area network, and using a portion of an address of the router to identify the store. The method can comprise determining one or more taxes based on a location of the store and receiving a selection from a user through the wireless local area network of one or more selected items from one or more available items. The method can further comprise determining a price for each of the one or more selected items based at least in part on the portion of the address of the router and calculating a tax for each one of the one or more selected items based at least in part on the portion of the address of the router. Other embodiments of related methods and systems are also provided.

20 Claims, 8 Drawing Sheets

(56) References Cited

U.S. PATENT DOCUMENTS

| | | |
|---|---|---|
| 2007/0101208 A1 | 5/2007 | Mohr |
| 2008/0082225 A1 | 4/2008 | Barrett |
| 2011/0093522 A1* | 4/2011 | Chen ................ H04L 29/12066 709/203 |
| 2013/0013499 A1* | 1/2013 | Kalgi .................... G06Q 20/12 705/41 |
| 2013/0267254 A1* | 10/2013 | Zhang ................ G06Q 10/1093 455/456.3 |
| 2014/0249916 A1* | 9/2014 | Verhaeghe ............. G06Q 40/12 705/14.51 |
| 2014/0282636 A1* | 9/2014 | Petander .......... H04N 21/41407 725/1 |
| 2015/0148061 A1* | 5/2015 | Koukoumidis ....... H04W 4/022 455/456.1 |

OTHER PUBLICATIONS

9 Price Check Apps You Should Have—The Krazy Coupon Lady... https://thekrazycouponlady.com/tips/money/price-check-appsMay 2, 2014 (Year: 2014).*

Shopper Tally app: Brilliantly simple | MNN—Mother Nature Network...htttps://www.mnn.com > Money > Personal FinanceJan. 11, 2013—(Year: 2013).*

* cited by examiner

SYSTEM AND METHOD FOR MOBILE CHECKOUT

TECHNICAL FIELD

This disclosure relates generally to systems for mobile checkout, and relates more particularly to systems to determine a location of a store, items selection by a user, and calculate a final total cost for the items selected, and to related methods.

BACKGROUND

When shopping for items, some users use a mobile device to checkout and/or send a payment for the items. In some situations, the system receiving the payment and/or providing the checkout services may need to know the location of the items and/or the user in order to accurately calculate a final total cost. Accordingly, there is a need for systems and methods to provide a better mobile checkout for users to purchase their selected items.

BRIEF DESCRIPTION OF THE DRAWINGS

To facilitate further description of the embodiments, the following drawings are provided in which.

To facilitate further description of the embodiments, the following drawings are provided in which.

Figure 1:
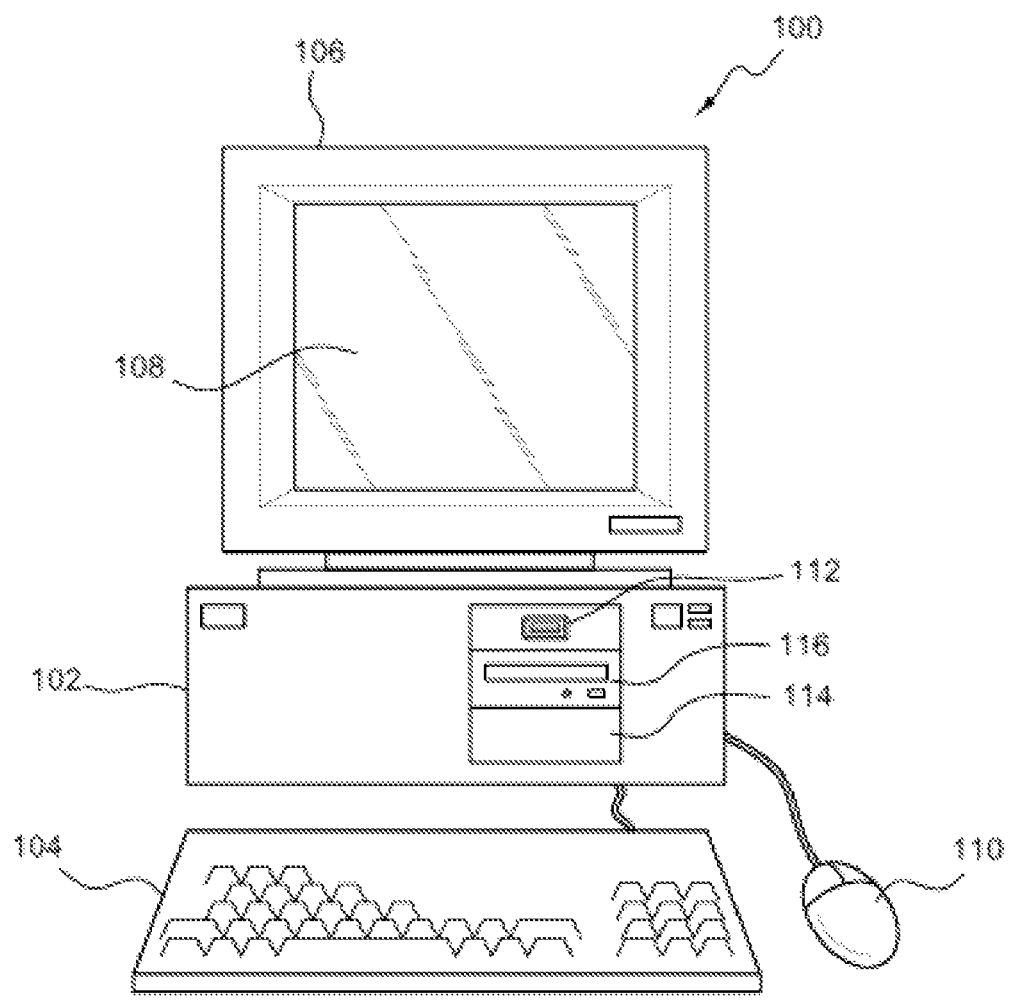
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a method. In some embodiments, a method can comprise receiving a request from a client device to join a wireless local area network in a store, allowing the client device to connect to a router of the wireless local area network, and using a portion of an address of the router to identify the store. The method can comprise determining one or more taxes based on a location of the store and receiving a selection from a user through the wireless local area network of one or more selected items from one or more available items. The method can further comprise determining a price for each of the one or more selected items based at least in part on the portion of the address of the router and calculating a tax for each one of the one or more selected items based at least in part on the portion of the address of the router.

Some embodiments can include a system. In many embodiments, the system can comprise a user input device, a display device, one or more processing modules, and one or more non-transitory storage modules storing computing instructions configured to run on the one or more processing modules and perform acts. In many embodiments, the acts comprise receiving a request from a client device to join a wireless local area network in a store, allowing the client device to connect to a router of the wireless local area network, and using a portion of an address of the router to identify the store. The acts can further comprise determining one or more taxes based on a location of the store and receiving a selection from a user through the wireless local area network of one or more selected items from one or more available items. In some embodiments, the acts can comprise determining a price for each of the one or more selected items based at least in part on the portion of the address of the router, calculating a tax for each one of the one or more selected items based at least in part on the portion of the address of the router, and adding the prices and the taxes for the one or more selected items to calculate a total cost for the user. In many embodiments, the acts can comprise providing instructions to present the total cost to the user through the wireless local area network and receiving a payment from the user for the total cost through the wireless local area network.

Various embodiments of systems and methods for mobile checkout can include at least one non-transitory memory storage module having computer instructions stored thereon executable by one or more processing modules. In many embodiments, the computer instructions comprise instructions to receive a request from a client device to join a wireless local area network in a store, allow the client device to connect to a router of the wireless local area network, and use a portion of an address of the router to identify the store. In some embodiments, the computer instructions further comprise instructions to determine one or more taxes based on a location of the store and receive a selection from a user through the wireless local area network of one or more selected items from one or more available items. The computer instructions can comprise instructions to determine a price for each of the one or more selected items based at least in part on the portion of the address of the router, calculate a tax for each one of the one or more selected items based at least in part on the portion of the address of the router, and add the prices and the taxes for the one or more selected items to calculate a total cost for the user. In many embodiments, the computer instructions further comprise instructions to provide instructions to present the total cost to the user through the wireless local area network and receive a payment from the user for the total cost through the wireless local area network.

Various embodiments include a method. The method can comprise receiving form a user a request to stock an item at a store at a location. In many embodiments, the method can include updating a product wish list for the store by at least one of adding the item to the product wish list for the store at the location, or increasing a count for the item on the product wish list for the store at the location, if the item is already on the product wish list. The method can further comprise ordering the item and offering the item for sale at the store at the location.

Some embodiments include a system. The system comprises a user input device, a display device, and one or more processing modules. The system can further comprise one or more non-transitory storage modules storing computing instructions configured to run on the one or more processing modules and perform the acts of receiving from a user a request to stock an item at a store at a location, updating a product wish list for the store, ordering the item; and offering the item for sale at the store at the location. In some embodiments, updating the product wish list for the store can comprise at least one of adding the item to the product wish list for the store at the location or increasing a count for the item on the product wish list for the store at the location, if the item is already on the product wish list.

Various embodiments of systems and methods for product wish lists can include at least one non-transitory memory storage module having computer instructions stored thereon executable by one or more processing modules. In many embodiments, the computer instructions comprise instructions to receive from a user a request to stock an item at a store at a location, update a product wish list for the store, order the item; and offer the item for sale at the store at the location. In many embodiments, updating the product wish list for the store comprises at least one of adding the item to the product wish list for the store at the location or increasing a count for the item on the product wish list for the store at the location, if the item is already on the product wish list.

Figure 2:
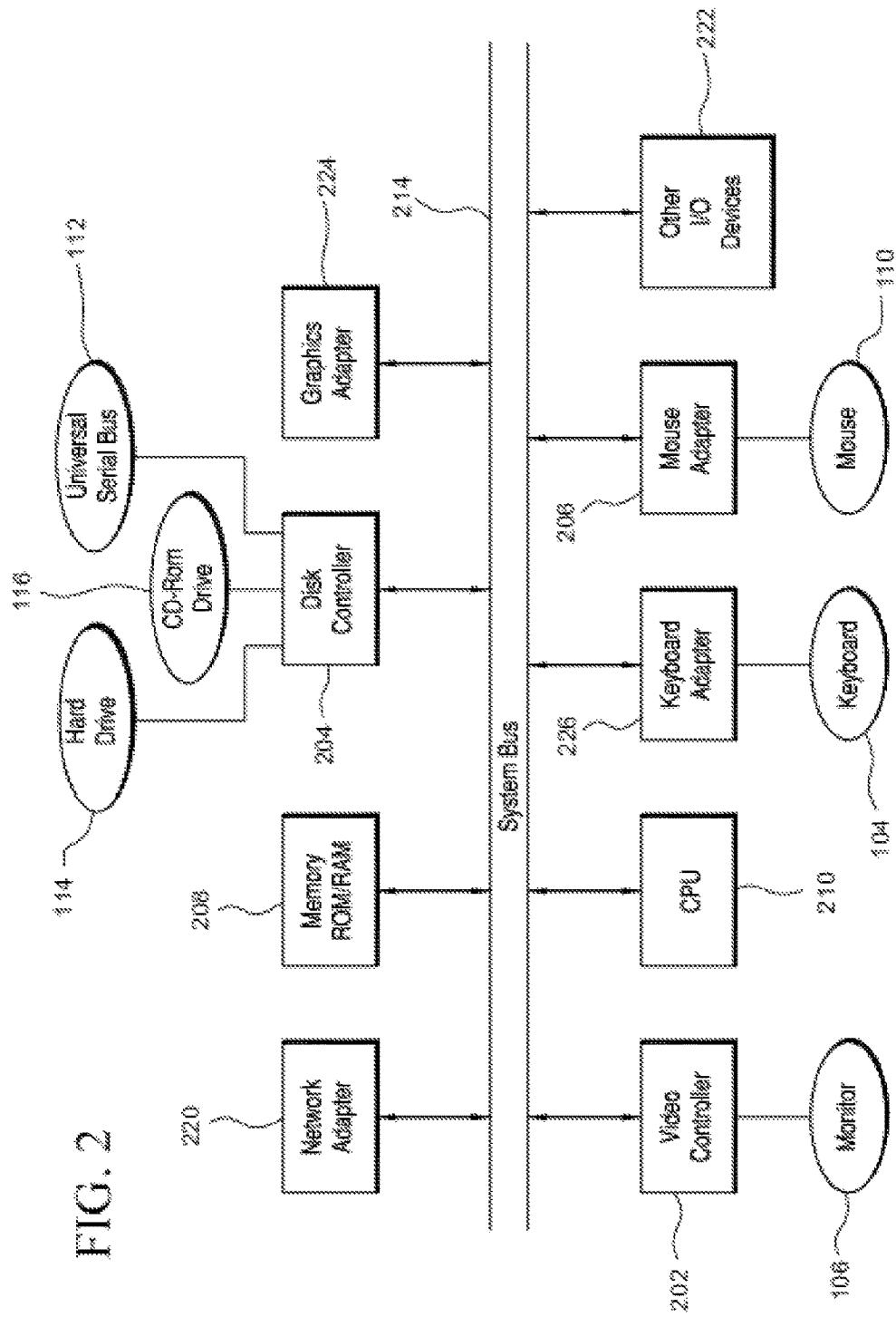
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
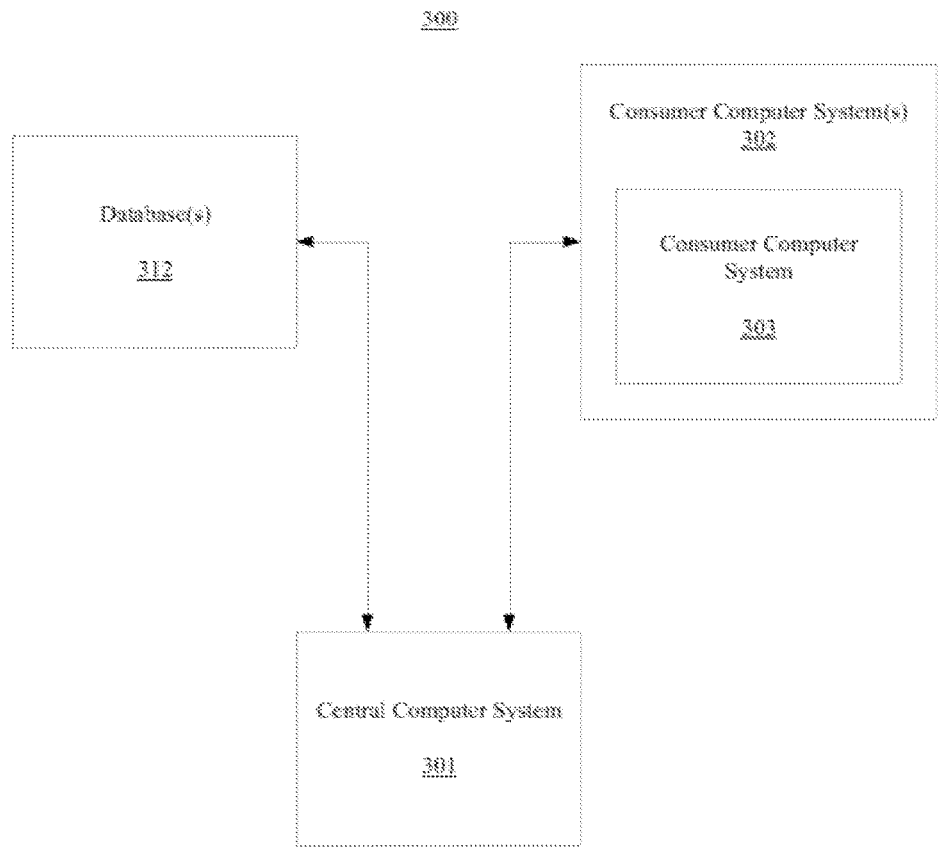
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more acts performed by the consumer; and reactive acts can refer to acts (e.g., identification, determination, communication, etc.) performed with consideration of (i.e., in response to) one or more acts performed by the consumer. For example, in some embodiments, the act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touch screen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile electronic devices, etc. At least part of central computer system 301 can be located remotely from consumer computer system(s) 302.

In some embodiments, a mobile electronic device can refer to a portable electronic device (e.g., an electronic device easily conveyable by hand by a person of average size) with the capability to present audio and/or visual data (e.g., images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ or a similar product by Google Inc. of Menlo Park, Calif., United States of America; (ii) the Eye Tap™, the Laser Eye Tap™, or a similar product by ePI Lab of Toronto, Ontario, Canada, and/or (iii) the Raptyr™, the STAR 1200™, the Vuzix Smart Glasses M100™, or a similar product by Vuzix Corporation of Rochester, N.Y., United States of America. In other specific examples, a head mountable wearable user computer device can comprise the Virtual Retinal Display™, or similar product by the University of Washington of Seattle, Wash., United States of America. Meanwhile, in further specific examples, a limb mountable wearable user computer device can comprise the iWatch™, or similar product by Apple Inc. of Cupertino, Calif., United States of America, the Galaxy Gear or similar product of Samsung Group of Samsung Town, Seoul, South Korea, the Moto 360 or similar product of Motorola of Schaumburg, Ill., United States of America, and/or the Zip™, One™, Flex™, Charge™, Surge™, or similar product by Fitbit Inc. of San Francisco, Calif., United States of America.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312 or it can be spread across multiple of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system (s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.)

and/or protocols (e.g., personal area network (PAN) protocol (s), local area network (LAN) protocol(s), wide area network (WAN) protocol(s), cellular network protocol(s), powerline network protocol(s), etc.). Exemplary PAN protocol (s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer, but in many embodiments, the functionality of system 300 can be extended to each of consumer computer system(s) 302 and/or to multiple consumers. In these extended examples, in some embodiments, single consumers can interface (e.g., interact) with central computer system 301 with multiple consumer computer systems of consumer computer system (s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile electronic device), such as, for example, when interfacing with central computer system 301 away from home.

In many types of retail businesses, the retail business uses a checkout model for purchases. A consumer chooses one or more items that he/she wishes to purchase. The consumer then presents the one or more items to an employee of the retail business. The employee proceeds to determine the total cost of the items, receives payment from the consumer, then provides the items to the consumer.

There are various alternative arrangements for allowing a consumer to purchase items from a brick and mortar retail business. For example, there is the "self-checkout" model. In the self-checkout model, after a consumer selects the goods he wishes to purchase, the consumer scans items for purchases. Generally, there are one or more self-checkout stands in one area of the brick and mortar retail business. Thus, one employee can monitor the check-out of multiple consumers at the same time, instead of needing one employee for each line of consumers.

A novel method of allowing consumers to shop is a technology that some retailers call scan and go. Briefly, in a scan and go methodology, a consumer uses a mobile electronic device to indicate his purchases as he travels through a retailer. When he wants to leave the retailer, he performs a checkout. To more thoroughly describe this process, refer to FIG. 4.

Figure 4:
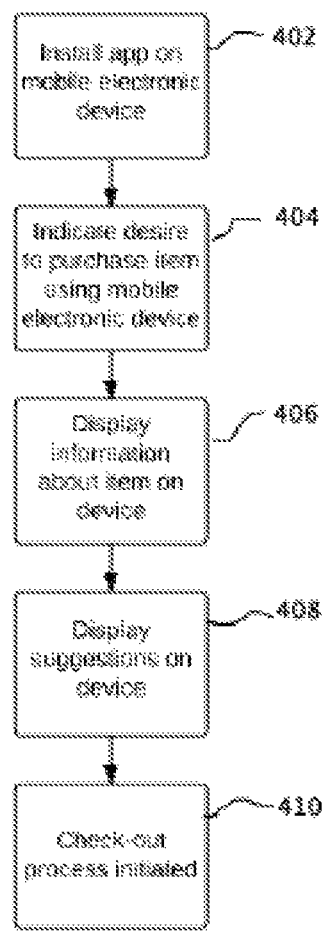
FIG. 4 is a flowchart illustrating a method of a scan and go methodology according to an embodiment.

A flowchart illustrating the operation of a scan and go methodology 400 is presented in FIG. 4. Method 400 is merely exemplary and is not limited to the embodiments presented herein. Method 400 can be employed in many different embodiments or examples not specifically depicted or described herein. In some embodiments, the procedures, the processes and/or the activities of method 400 can be performed in the order presented. In other embodiments, the procedures, the processes, and/or the activities of method 400 can be performed in any other suitable order. In still other embodiments, one or more of the procedures, the processes, and/or the activities of method 400 can be combined or skipped. In some embodiments, portions of method 400 can be implemented by computer system 100 (FIG. 1).

A consumer installs an app on a mobile electronic device (block 402). Referring back to FIG. 3, the mobile electronic device can be one of consumer computer system(s) 302. As described above, a variety of different mobile electronic devices can be used. A smartphone would be the most common type of portable electronic device that would be used in such a scenario. Other mobile electronic devices such as phablets, tablets, portable music players, special-purpose scanning devices, wearable electronic devices, and other electronic devices that have internet connectivity also can be used. In some embodiments, instead of a consumer installing an app on his mobile electronic device, a consumer can use a special-purpose electronic device provided by the retailer.

Returning to FIG. 4, the consumer then travels through a retailer's store to find items he wishes to purchase. When he finds an item he wishes to purchase, he uses the mobile electronic device to indicate the desire to purchase the item (block 404). This indication can be accomplished in one of a variety of different manners.

For example, as described above, there can be an application (also known as an "app") in a mobile electronic device that can provide a consumer with the ability to scan items to be purchased. The app would use a camera of the mobile electronic device to scan or to take a photograph of the universal product code (UPC), international standard book number (ISBN), or other unique identifier of the product that the consumer wishes to purchase. With reference to FIG. 3, the mobile electronic device (e.g., consumer computer system 303) can be in communication with central computer system 301. Central computer system 301 is in communication with one or more databases 312. Among databases 312, there can be a product database containing information about each product sold by the retailer.

Returning to FIG. 3, the app then searches a database (such as a product database) to find the product and displays information about the product on the mobile electronic device (block 406). The user can be provided with an opportunity to confirm the purchase. In some embodiments, the app also can provide suggestions to the consumer (block 408). For example, the app can inform the consumer that a different size of the product is on sale. The app can suggest products that are often purchased with the chosen product (e.g., suggesting fabric softener when a consumer chooses a laundry detergent). Many other features also can be present.

After the consumer finishes shopping, the consumer approaches a checkout area of the retailer. However, because the consumer already scanned each of the items he wishes to purchase using the mobile electronic device in some embodiments, he does not need to scan the items again. Instead, In some embodiments, the consumer needs only to pay for the items. The consumer begins the checkout process (block 410). This can involve using the mobile electronic device to enter payment information. In some embodiments, the consumer has the capability to provide and store payment information into the mobile electronic device. For example, the consumer can store credit card information (such as an account number, an expiration date, and a card security code) in the mobile electronic device. In that type of situation, the consumer can indicate his desire to apply the previously entered payment information to the purchase. The consumer also can pay for the selected goods using cash or a check through a terminal at the retailer. The consumer will typically place the purchase products in plastic bags, paper bags, reusable bags, boxes, and the like for ease in transporting the goods.

Figure 5:
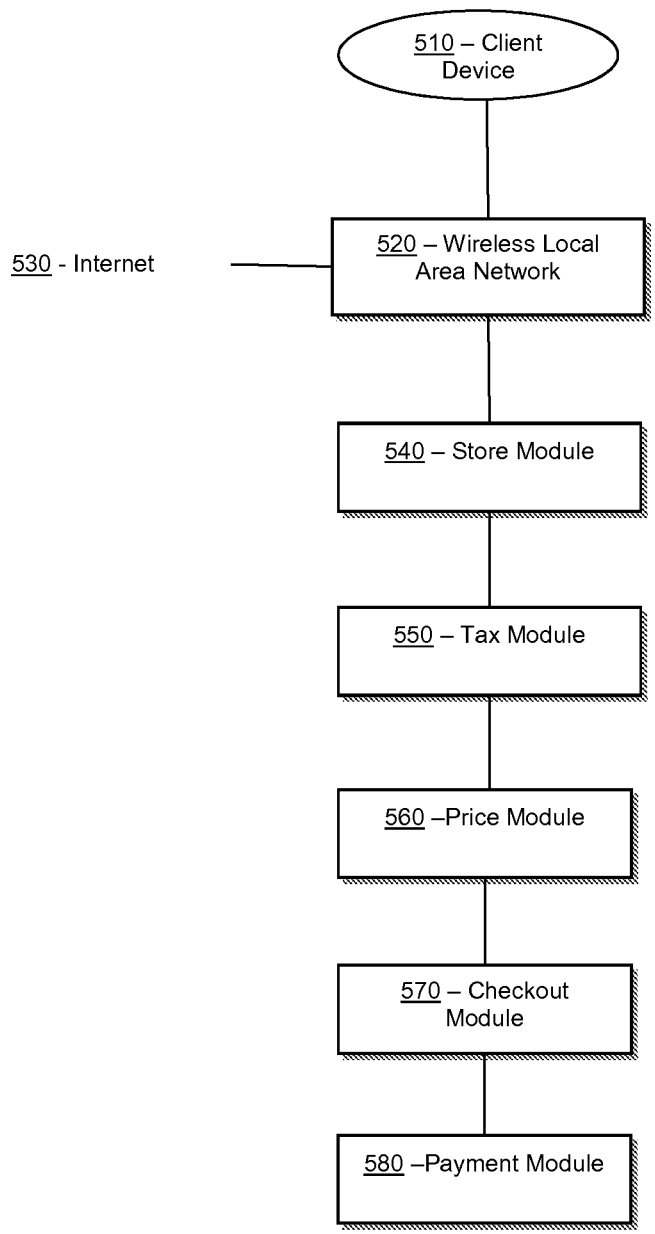
FIG. 5 illustrates a representative block diagram of a system, according to an embodiment.

Skipping ahead now in the drawings, FIG. 5 illustrates a representative block diagram of a system 500, according to an embodiment. System 500 is merely exemplary and embodiments of the system are not limited to the embodiments presented herein. System 500 can be employed in many different embodiments or examples not specifically depicted or described herein. In some embodiments, certain elements or modules of system 500 can perform various methods and/or activities of those methods. In these or other embodiments, the methods and/or the activities of the methods can be performed by other suitable elements or modules of system 500.

As described in greater detail below, system 500 can be operable to provide mobile checkout, for example, providing mobile checkout of groceries at a store. As also described in greater detail below, in many embodiments, system 500 can be further operable to permit the consumer to engage in electronically implemented brick-and-mortar (i.e., scan and go) commerce. In these embodiments, by making mobile checkout readily available for the consumer, system 500 can facilitate scan and go commerce.

In many embodiments, system 500 can include a wireless local area network 520. Wireless local area network 520 can be in communication with an internet 530. In some embodiments, internet 530 can comprise the world wide web, and can include a central computer system such as central computer system 301 (FIG. 3). In some embodiments, internet 530 can comprise an intranet. In many embodiments, wireless local area network 520 can receive a request from a client device 510 to join wireless local area network 520. In some embodiments, client device 510 can comprise a user input device and/or a display device, and can be similar to consumer computer system 303 (FIG. 3). In some embodiments, client device 510 can be a mobile phone or tablet. Wireless local area network 520 can allow the client device to connect to a router of wireless local area network 520.

System 500 also can include a store module 540. In many embodiments, store module 540 can use a portion of an address of the router to identify a store. In some embodiments, the address can be an internet protocol address (IP address). For example, if the address of the router is "172.12.254.1," store module 540 can use the portion "12" to identify store number 12 in a chain of stores. In some embodiments, a 32 bit IP address can be used, while in other embodiments, a larger IP address, such as a 128 bit IP address, can be used. In a 32 bit IP address, each portion (e.g., portion "12") of the IP address can have a maximum value of 255. In some embodiments more than one portion of the IP address can be used to identify the store number. In some embodiments, a search domain in a Domain Name System (DNS) can be used. For example, if the search domain in DNS is "sams06612.sjc.wayport.net," store module 540 can use the portion "06612" to identify a store number 6612 in a chain of stores.

System 500 can further include a tax module 550. In some embodiments, tax module 550 can determine one or more taxes based on a location of the store. For example, system 500 can communicate to tax module 550 that store number 12 is located in a particular city, county, and/or state/province. From this, tax module 550 can determine the particular taxes associated with the particular city, county, and/or state/province. In some embodiment, taxes can include different tax rates. In some embodiments, a food tax can be associated with the purchase of food in the particular city, county, and/or state/province and/or a sales tax can be associated with the sale of goods in the particular city, county, and/or state/province.

In many embodiments, system 500 can include a checkout module 570. Checkout module 570 can receive a selection from a user through wireless local area network 520 of one or more selected items. In many embodiments, checkout module 570 can receive the selection from the user from client device 510 through wireless local area network 520. In some embodiments, system 500 can determine one or more available items based at least in part on the portion of the address of the router, and the user can make a selection of items based in part on the one or more available items.

System 500 can further include a price module 560. Price module 560 can determine a price for each of the one or more selected items. In many embodiments, price module 560 determines the price for each of the one or more selected items based on the portion "12" of the address of the router. For example, from the address of the router, price module 560 can determine the price for each of the one or more selected items by determining pricing and/or promotions at the particular store (e.g., store number 12 in a chain of stores). In some embodiments, price module 560 can determine the price for each of the one or more selected items after applying any coupons and/or discounts.

System 500 can further include a payment module 580. Payment module 580 can receive a payment from the user through wireless local area network 520, for a total cost of the selected items. In many embodiments, the total cost of the selected items includes the price of the selected items and the associated taxes calculated for the selected items. In some embodiments, the system can provide instructions to present the total cost to the user through wireless local area network 520. In some of these embodiments, providing instructions to present the total cost can include providing instructions to present the total cost to a display coupled to client device 510. In some embodiments, system 500 can update the store inventory based on the items purchased by the user.

Any of the modules described in FIG. 5 and/or additional modules can further perform the acts of prefetching at least one of the one or more available items to client device 510. In some embodiments, the prefetching can occur after client device 510 connects to wireless local area network 520. In some embodiments, the prefetching can occur within approximately 3 minutes to approximately 7 minutes of connecting to wireless local area network 520. Prefetching at least one of the one or more available items can comprise prefetching at least one item based on: a purchase history of the user, popular items, seasonal items, promotional items, location of the user, location of items, and/or prefetch success history. Prefetch success history can include items that have been purchased after being prefetched to the user and/or client device 510. In some embodiments, approximately 10 to approximately 30 items can be prefetched at a time. In many embodiments, approximately 8 megabytes (MB) to approximately 12 MB of data can be prefetched at a time.

Any of the modules described in FIG. 5 and/or additional modules can further perform the acts of crowdsourcing product information. In some embodiments, crowdsourcing product information can include receiving a notice from the user that the price of one of the one or more available items is inaccurate and updating the price of the one of the one or more available items based at least in part on the notice from the user.

Figure 6:
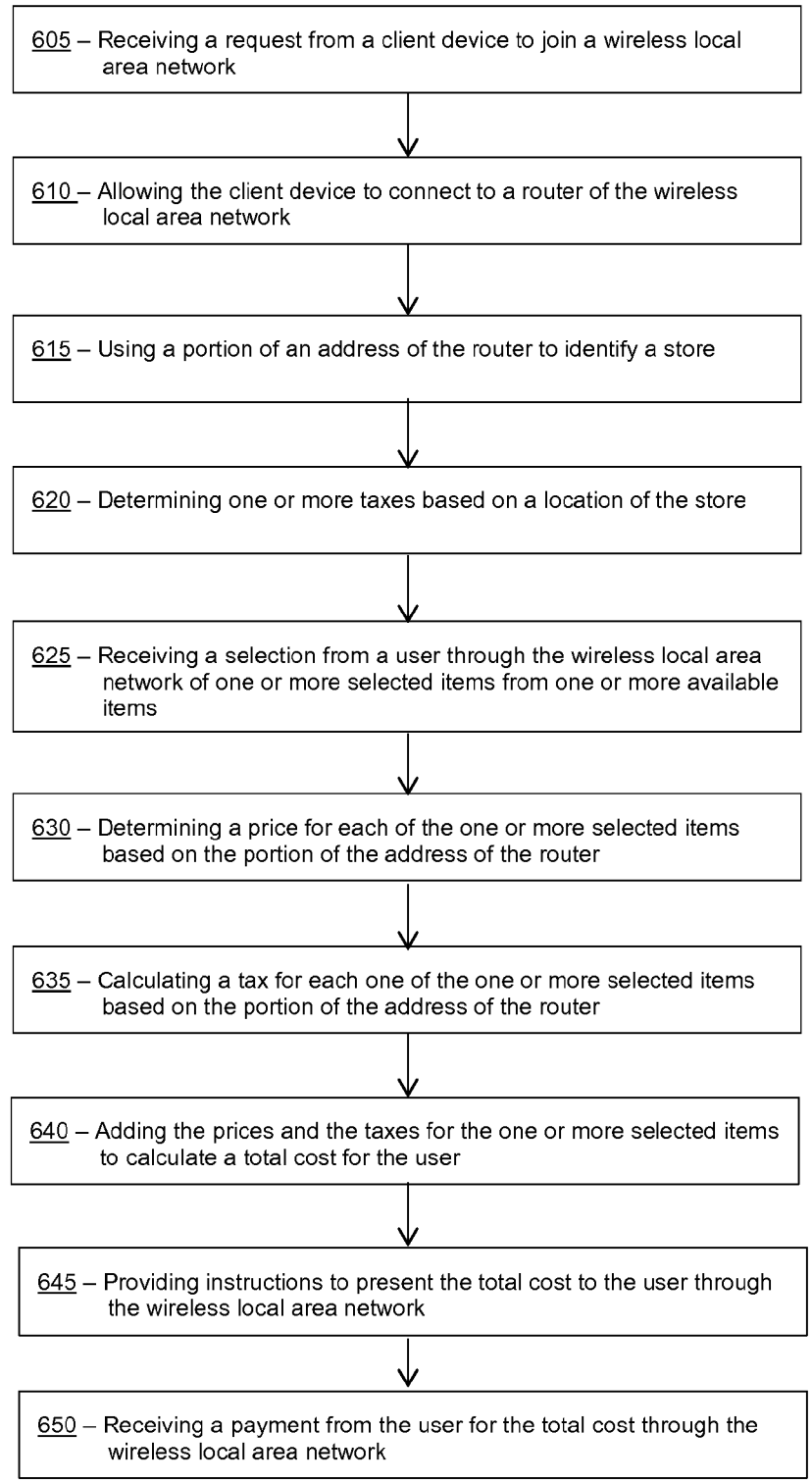
FIG. 6 illustrates a flow chart for a method, according to an embodiment.

Turning ahead in the drawings, FIG. 6 illustrates a flow chart for a method 600, according to an embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 500 (FIG. 5) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules 540, 550, 560, 570, and/or 580 (FIG. 5). Such non-transitory memory storage modules can be part of a computer system such as central computer system 301 (FIG. 3). The processing module(s) can be similar or identical to the processing module(s) described above with respect to computer system 100 (FIG. 1).

Method 600 can comprise activity 605 of receiving a request from a client device to join a wireless local area network, such as wireless local area network 520 (FIG. 5). In some embodiments, the client device can be similar or identical to the client device 510 (FIG. 5). Method 600 can further comprise activity 610 of allowing the client device to connect to a router of the wireless local area network and activity 615 of using a portion of an address of the router to identify a store. In many embodiments, method 600 can comprise activity 620 of determining one or more taxes based on a location of the store. The location of the store can be located in a database with a lookup table showing various taxes. In some embodiments, the one or more taxes can comprise a food sales tax and/or a sales tax. In some embodiments, one or more taxes can be zero percent, for example, the food sales tax in some store locations can be zero percent, while the sales tax can be another percentage. In some embodiments, the food sales tax is different than the sales tax.

In many embodiments, method 600 can further comprise activity 625 of receiving a selection from a user through the wireless local area network of one or more selected items from one or more available items. In some embodiments, method 600 can comprise an activity of determining the one or more available items based at least in part on the portion of the address of the router. In one embodiment, before the activity of determining the one or more available items based at least in part on the portion of the address of the router and the user can make the selection of one or more selected items from the one or more determined available items. The system can then receive the selection from the user.

Method 600 also can comprise activity 630 of determining a price for each of the one or more selected items based on the portion of the address of the router. In some embodiments, the price can include coupons or other discounts or promotions. In other embodiments, the price is adjusted after the user scans a coupon and/or enters a coupon or discount code. In many embodiments, method 600 can comprise a crowdsourcing activity to assist in providing accurate pricing. For example, in some embodiments, the crowdsourcing activity can include an activity of receiving a notice from the user that the price of one of the one or more available items is inaccurate. In some embodiments, method 600 can include an activity of updating the price of the one of the one or more available items based at least in part on the notice from the user.

In some embodiments, method 600 can further comprise an activity 635 of calculating a tax for each one of the one or more selected items based on the portion of the address of the router and an activity 640 of adding the prices and the taxes for the one or more selected items to calculate a total cost for the user. Method 600 can comprise an activity 645 of providing instructions to present the total cost to the user through the wireless local area network and an activity 650 of receiving a payment from the user for the total cost through the wireless local area network. In some embodiments, payment can be received from client device 510 (FIG. 5).

In some embodiments, method 600 can further comprise prefetching at least one of the one or more available items to a mobile device of the user. The mobile device of the user can be similar or identical to client device 510 (FIG. 5). In many embodiments, the prefetching can occur after the client device connects to the wireless local area network in the store. In some embodiments, the prefetching can occur within approximately 3 minutes to approximately 7 minutes of connecting to the wireless local area network. In some embodiments, the prefetching can occur depending on the location of the mobile device of the user. For example, as the mobile device of the user enters a dairy section of the store, prefetching of available items and/or prices of the available items found in the dairy section can occur. Then, as the mobile device of the user enters the meat section of the store, prefetching of available items and/or prices of the available items found in the meat section can occur. In some embodiments, prefetching at least one of the one or more available items can comprise prefetching at least one item based on a purchase history of the user. For example, if the user has purchased a certain brand of cereal in the past, the availability, price and/or promotion of that brand of cereal can be prefetched. In some embodiments, if the user has purchased a certain brand of cereal in the past, the availability, price and/or promotion of another brand of cereal can be prefetched. In some embodiments, prefetching at least one of the one or more available items can comprise prefetching at least one item based on popular items. In some embodiments, prefetching at least one of the one or more available items can comprise prefetching at least one item based on promotional and/or seasonal items. The prefetched data can come from the internet/cloud (e.g., outside of the store) and/or from the local area network (e.g., inside the store).

Figure 7:
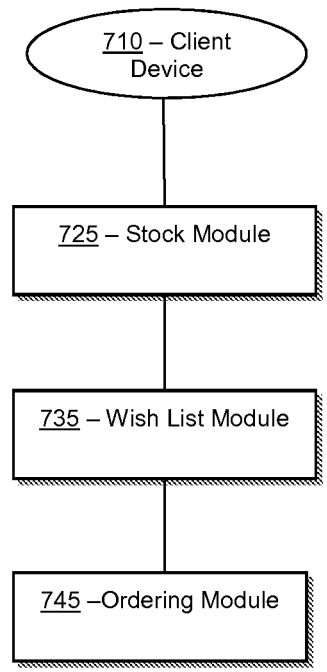
FIG. 7 illustrates a representative block diagram of a system, according to an embodiment.

Turning ahead now in the drawings, FIG. 7 illustrates a representative block diagram of a system 700, according to an embodiment. System 700 is merely exemplary and embodiments of the system are not limited to the embodiments presented herein. System 700 can be employed in many different embodiments or examples not specifically depicted or described herein. In some embodiments, certain elements or modules of system 700 can perform various methods and/or activities of those methods. In these or other embodiments, the methods and/or the activities of the methods can be performed by other suitable elements or modules of system 700.

As described in greater detail below, system 700 can be operable to provide a product wish list for a particular store location. As also described in greater detail below, in many embodiments, system 700 can be further operable to permit the consumer to engage in electronically implemented brick-and-mortar (i.e., scan and go) commerce. In these embodiments, by making mobile checkout readily available for the consumer, system 700 can facilitate scan and go commerce. In some embodiments, the product wish list is public and available for any customer of the store to view. In some embodiments, any customer can view the product wish list, but must become a user of an application in order to request an item be added to the product wish list or increase a count of the number of requests for the item. In other embodiments, the product wish list is only available for users of an application or other system to view and/or request the item to be added or update the count of the number of requests for the item.

System 700 can comprise non-transitory memory storage modules 725, 735, and 745. Memory storage module 725 can also be referred to as a stock module 725 can receive from a user a request to stock an item at a store at a location. In some embodiments, the request can come from a client device 710. Client device 710 can be similar to client device 510 (FIG. 5). In some embodiments, client device 710 can comprise a user input device and/or a display device. In some embodiments, client device can be a mobile phone or tablet. In some embodiments, wireless local area network 520 (FIG. 5) can allow client device 710 to connect to a router of wireless local area network 520 (FIG. 5). In some embodiments, receiving from the user the request to stock the item at the store at the location occurs while the user is physically located in the store.

Memory storage module 735 can also be referred to as a wish list module 735. Wish list module 735 can update the product wish list for the store by adding the item to the product wish list for the store and/or increasing a count for the item on the product wish list for the store, if the item is already on the product wish list.

In many embodiments, memory storage module 745 can also be referred to as an ordering module 745. Ordering module 745 can order the item to make available for sale at the store. In some embodiments, ordering module 745 can order the item to restock the item at the store.

In many embodiments, system 700 can offer the product for sale at the store at the location. In some embodiments, offering the item for sale at the location can comprise offering site to store pick up, wherein the user orders the item from the client device and picks up the item at the store at a later time. In some embodiments, offering the item for sale at the location can comprise stocking the item on the shelves of the store at the location.

Figure 8:
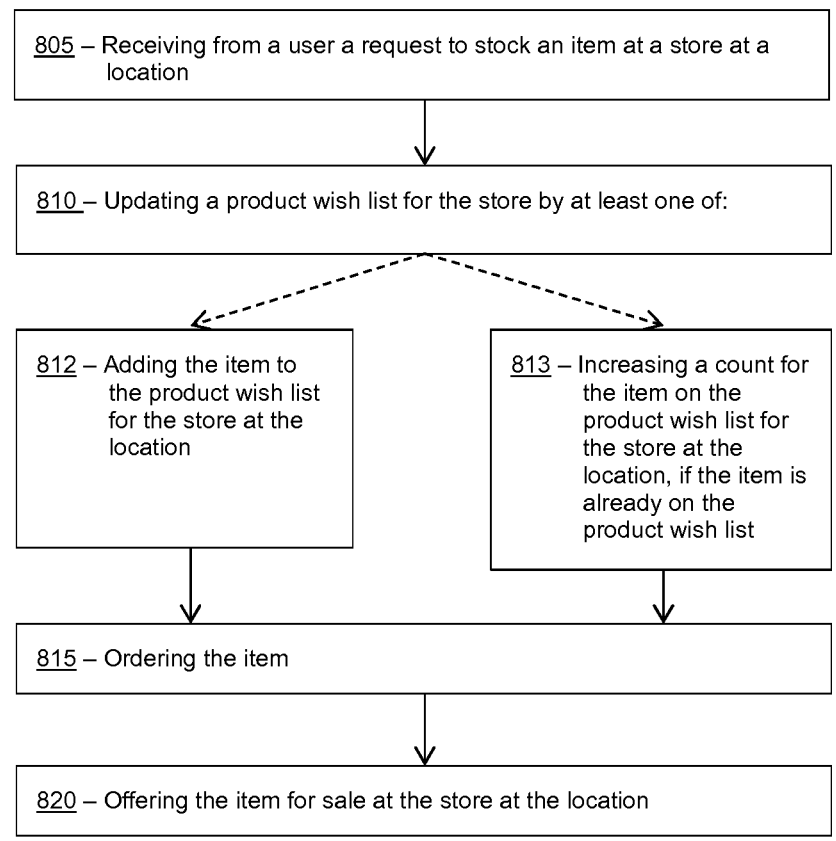
FIG. 8 illustrates a flow chart for a method, according to an embodiment.

Turning ahead in the drawings, FIG. 8 illustrates a flow chart for a method 800, according to an embodiment. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. In many embodiments, system 700 (FIG. 7) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules 725, 735, and/or 745 (FIG. 7). The processing module(s) can be similar or identical to the processing module(s) described above with respect to computer system 100 (FIG. 1).

Method 800 includes an activity 805 of receiving from a user a request to stock an item at a store at a location. In some embodiment, activity 805 of receiving from the user the request to stock the item at the store at the location occurs while the user is physically located in the store. In other embodiments, activity 805 of receiving from the user the request to stock the item at the store at the location occurs while the user at another location, for example, at home while browsing an online catalog of items available at the user's local store.

In some embodiments, method 800 can include an activity of identifying the store at the location. In many embodiments, identifying the store at the location can comprise receiving a request from a client device, such as client device 510 (FIG. 5) to join a wireless local area network, such as wireless local area network 520 (FIG. 5), allowing the client device to connect to a router of the wireless local area network, and using a portion of an address of the router to identify the store at the location.

In some embodiments, method 800 can further comprise identifying the item by searching a catalog of items at the store at the location and determining that the item is not stocked at the store. In some embodiments, determining that the item is not stocked at the store can include determining that the item is carried at the store, but out of stock on the store shelves, or determining that the item is not carried at the store.

Method 800 also can include an activity 810 of updating a product wish list for the store by at least one of: adding the item to the product wish list for the store (activity 812) or increasing a count for the item on the product wish list for the store, if the item is already on the product wish list (activity 813). In some embodiments, activity 812 of adding the item to the product wish list for the store can comprise at least one of: (1) searching an online catalog for the item, wherein the online catalog comprises items available at the store at another location; (2) searching a competitor online catalog for the item, wherein the competitor online catalog comprises items available from a competitor store; or (3) adding a description of the item.

In some embodiments, activity 813 of increasing a count for the item on the product wish list for the store, if the item is already on the product wish list comprises at least one of: (1) upvoting the item on the product wish list; (2) indicating approval of the item on the product wish list; or (3) sharing the item on the product wish list on a social network.

Method 800 can include an activity 815 of ordering the item to make it available for sale at the store. In some embodiments, activity 815 of ordering the item to make it available for sale at the store can include ordering the item to restock the store shelf if the store already carries the item, or ordering the item to begin carrying the item at the store at the location. Method 800 also can include placing the item on at least one of the shelves of the store at the location.

Method 800 also can include an activity 820 of offering the item for sale at the store at the location. In some embodiments, activity 820 of offering the item for sale at the location can comprise offering site to store pick up, wherein the user orders the item from the client device and picks up the item at the store at a later time. In some embodiments, activity 820 of offering the item for sale at the location can comprise stocking the item on the shelves of the store at the location.

In some embodiments, method 800 can further comprise facilitating displaying of an updated product wish list, including the item to the user and/or to a second user. In many embodiments, method 800 can further comprise receiving a request from the second user to stock the item at the store. In some embodiments, method 800 can comprise notifying the user and other users who increased the count for the item when the item is available for purchase at the store. In some embodiments, method 800 can include offering a promotion to the user and other users who increased the count for the item. In some embodiments, the promotion can be offered for the item when the item is available for purchase at the store. In some embodiments, the promotion can be offered for a similar item before the item is available for purchase at the store. In many embodiments, the promotion is offered for at least one of a limited time, a limited quantity, or a limited discount.

In some embodiments, method 800 can include suggesting to the user one or more items on the product wish to upvote or like. In some embodiments, method 800 can further comprise prompting the user to enter how often the user would buy the item and increasing the count for the item on the product list for an indication that the user would purchase the item regularly. In some embodiments, the indication that the user would purchase the item regularly can comprise the user indicating that the user would purchase the item at least one of: weekly, biweekly, or monthly.

Although systems and methods for a mobile checkout has been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims.

For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the activities of FIGS. 6 and 8 may include different activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method being implemented via execution of computing instructions configured to run at one or more processors and stored at one or more non-transitory computer-readable media, the method comprising:
   receiving a request to join a wireless local area network in a brick and mortar store from a software application ("app"), wherein the software app is installed on a mobile device of a user;
   allowing the mobile device to connect to a router of the wireless local area network;
   receiving an address of the router;
   using a portion of the address of the router to identify a particular location of the brick and mortar store, wherein the portion of the address is configured to identify a store number associated with the particular location of the brick and mortar store;
   determining multiple tax rates associated with the particular location of the brick and mortar store, the multiple tax rates comprising a federal tax rate, a state tax rate, and a local tax rate;
   receiving, through the wireless local area network, one or more items for purchase from the software app on the mobile device of the user;
   while the user shops in the brick and mortar store, receiving a request from the software app of the mobile device of the user that (1) notifies the brick and mortar store that an existing item that is offered for sale by the brick and mortar store is currently out of stock and (2) requests that the existing item be restocked, wherein the request further comprises the store number associated with the particular location of the brick and mortar store;
   responsive to receiving the request to restock the existing item, (i) ordering the existing item requested to be restocked and offered for sale at the brick and mortar store, and (ii) stocking the existing item on a shelf at the particular location of the brick and mortar store;
   automatically initiating, by sending instructions to the software app, a checkout process permitting the user to pay for the one or more items for purchase in response to detecting the mobile device near a checkout area of the brick and mortar store, wherein automatically initiating the checkout process comprises:
      determining one or more prices of the one or more items for purchase using the portion of the address of the router associated with the particular location of the brick and mortar store;
      receiving a notice from the user via the software app of the mobile device of the user that a price of one of the one or more items is inaccurate;
      updating the price of the one of the one or more items based at least in part on the notice from the user;
      calculating multiple taxes for the one or more items for purchase using the multiple tax rates to be associated with the particular location of the brick and mortar store;

adding up the one or more prices and the multiple taxes to calculate a total cost for the user; and providing instructions, to the software app, to present the total cost to the mobile device of the user through the wireless local area network to the software app; and receiving a payment from the software app on the mobile device of the user for the total cost through the wireless local area network.

2. The method of claim 1, further comprising:

receiving, from the software app of the mobile device of the user, a request for a new item that is not offered for sale at the brick and mortar store, wherein the request for the new item comprises the store number associated with the particular location of the brick and mortar store; and updating a product wish list at the brick and mortar store by requesting the new item that is not offered for sale at the brick and mortar store be added for sale at the brick and mortar store, wherein:

the product wish list is public and available to other users requesting the new item that is not offered for sale at the particular location of the brick and mortar store using the software app, wherein the software app is configured to be installed on mobile devices of the other users; and when the request for the new item from the software app of the mobile device of the user is for a specific item previously added to the product wish list by the other users, the request for the new item increases a count of a total number of requests for the specific item on the product wish list for the particular location of the brick and mortar store.

3. The method of claim 1, wherein at least one of:

the state tax rate further comprises:
 a food state sales tax rate; or
the local tax rate further comprises:
 a food local sales tax rate.

4. The method of claim 1, wherein:
the federal tax rate is zero percent.

5. The method of claim 1, further comprising:
determining, by crowdsourcing activity, that the price of the one of the one or more items is inaccurate.

6. The method of claim 1, wherein receiving the request from the software app on the mobile device of the user that (1) notifies the brick and mortar store that the existing item that is offered for sale by the brick and mortar store is currently out of stock and (2) requests that the existing item be restocked further comprises receiving a request to update a product wish list with an item for the brick and mortar store by at least one of:

searching an online catalog for the item to determine whether the item is available at another brick and mortar store location;

searching a competitor online catalog for the item to determine whether the item is available from a competitor store; or adding a description of the item for the brick and mortar store to add the item for purchase at the brick and mortar store.

7. The method of claim 1, wherein:
the state tax rate is zero percent.

8. The method of claim 1, wherein:
the local tax rate is zero percent.

9. A system comprising:
one or more processors; and one or more non-transitory storage media storing computer-readable instructions configured to run on the one or more processors to perform:

receiving a request to join a wireless local area network in a brick and mortar store from a software application ("app"), wherein the software app is installed on a mobile device of a user;

allowing the mobile device to connect to a router of the wireless local area network;

receiving an address of the router;

using a portion of the address of the router to identify a particular location of the brick and mortar store, wherein the portion of the address is configured to identify a store number associated with the particular location of the brick and mortar store;

determining multiple tax rates associated with the particular location of the brick and mortar store, the multiple tax rates comprising a federal tax rate, a state tax rate, and a local tax rate ;

receiving one or more items for purchase from the software app on the mobile device of the user;

while the user shops in the brick and mortar store, receiving a request from the software app on the mobile device of the user that (1) notifies the brick and mortar store that an existing item that is offered for sale by the brick and mortar store is currently out of stock and (2) requests that the existing item be restocked, wherein the request further comprises the store number associated with the particular location of the brick and mortar store;

responsive to receiving the request to restock the existing item, (i) ordering the existing item requested to be restocked and offered for sale at the brick and mortar store, and (ii) stocking the existing item on a shelf at the particular location of the brick and mortar store;

automatically initiating, by sending instructions to the software app, a checkout process permitting the user to pay for the one or more items for purchase in response to detecting the mobile device near a checkout area of the brick and mortar store, wherein automatically initiating the checkout process comprises:

determining one or more prices of the one or more items for purchase using the portion of the address of the router associated with the particular location of the brick and mortar store;

receiving a notice from the user via the software app of the mobile device of the user that a price of one of the one or more items is inaccurate;

updating the price of the one of the one or more items based at least in part on the notice from the user;

calculating multiple taxes for the one or more items for purchase using the multiple tax rates to be associated with the particular location of the brick and mortar store;

adding up the one or more prices and the multiple taxes to calculate a total cost for the user; and providing instructions, to the software app, to present the total cost to the mobile device of the user through the wireless local area network to the software app; and receiving a payment from the software app on the mobile device of the user for the total cost through the wireless local area network.

10. The system of claim 9, wherein:

the one or more non-transitory storage media storing the computer-readable instructions are configured to run on the one or more processors and further perform:
  receiving a request for a new item that is not offered for sale at the brick and mortar store from the software app of the mobile device of the user, wherein the request for the new item comprises the store number associated with the particular location of the brick and mortar store; and
  updating a product wish list at the brick and mortar store by requesting the new item that is not offered for sale at the brick and mortar store be added for sale at the brick and mortar store, wherein:
    the product wish list is public and available to other users requesting the new item that is not offered for sale at the particular location of the brick and mortar store using the software app, wherein the software app is configured to be installed on mobile devices of the other users; and
    when the request for the new item from the software app of the mobile device of the user is for a specific item previously added to the product wish list by other users, the request for the new item increases a count of a total number of requests for the specific item on the product wish list for the particular location of the brick and mortar store.

11. The system of claim 9, wherein:
the multiple tax rates further comprise:
  at least one of:
    a food sales tax rate; or
    a sales tax rate.

12. The system of claim 9, wherein:
the one or more non-transitory storage media storing the computer-readable instructions are configured to run on the one or more processors and further perform:
  determining, by crowdsourcing activity, that the price of the one of the one or more items is inaccurate.

13. The system of claim 9, wherein:
the federal tax rate is zero percent.

14. The system of claim 9, wherein:
the state tax rate is zero percent.

15. The system of claim 9, wherein:
the local tax rate is zero percent.

16. At least one non-transitory memory storage media having computer instructions stored thereon executable by one or more processors to:
  receive a request to join a wireless local area network in a brick and mortar store from a software application ("app"), wherein the software app is installed on a mobile device of a user;
  allow the mobile device to connect to a router of the wireless local area network;
  receive an address of the router;
  use a portion of the address of the router to identify a particular location of the brick and mortar store, wherein the portion of the address is configured to identify a store number associated with the particular location of the brick and mortar store;
  determine multiple tax rates associated with the particular location of the brick and mortar store, the multiple tax rates comprising a federal tax rate, a state tax rate, or a local tax rate;
  receive one or more items for purchase from the software app on the mobile device of the user;
  while the user shops in the brick and mortar store, receive a request from the software app that (1) notifies the brick and mortar store that an existing item that is offered for sale by the brick and mortar store is currently out of stock and (2) requests that the existing item be restocked, wherein the request further comprises the store number associated with the particular location of the brick and mortar store;
  responsive to receiving the request to restock the existing item, (i) order the existing item requested to be restocked and offered for sale at the brick and mortar store, and (ii) stocking the existing item on a shelf at the particular location of the brick and mortar store;
  automatically initiate, by sending instruction to the software app, a checkout process permitting the user to pay for the one or more items for purchase in response to detecting the mobile device near a checkout area of the brick and mortar store, wherein automatically initiating the checkout process comprises:
    determine one or more prices of the one or more items for purchase using the portion of the address of the router associated with the particular location of the brick and mortar store;
    receiving a notice from the user via the software app of the mobile device of the user that a price of one of the one or more items is inaccurate;
    updating the price of the one of the one or more items based at least in part on the notice from the user;
    calculate multiple taxes for the one or more items for purchase using the multiple tax rates to be associated with the particular location of the brick and mortar store;
    add up the one or more prices and the multiple taxes to calculate a total cost for the user; and
    provide instructions, to the software app, to present the total cost to the mobile device of the user through the wireless local area network to the software app; and
  receive a payment from the software app on the mobile device of the user for the total cost through the wireless local area network.

17. The at least one non-transitory memory storage media of claim 16, further comprising computer instructions stored thereon executable by one or more processors to:
  receive a request for a new item that is not offered for sale at the brick and mortar store from the software app of the mobile device of the user, wherein the request for the new item comprises the store number associated with the particular location of the brick and mortar store; and
  update a product wish list at the brick and mortar store by requesting the new item that is not offered for sale at the brick and mortar store be added for sale at the brick and mortar store, wherein:
    the product wish list is public and available to other users requesting the new item that is not offered for sale at the particular location of the brick and mortar store using the software app, wherein the software app is configured to be installed on mobile devices of the other users; and
    when the request for the new item from the software app of the mobile device of the user is for a specific item previously added to the product wish list by the other users, the request for the new item increases a count of a total number of requests for the specific item on the product wish list for the particular location of the brick and mortar store.

18. The at least one non-transitory memory storage media of claim 16, wherein:
the federal tax rate is zero percent.

19. The at least one non-transitory memory storage media of claim 16, wherein:
 the state tax rate is zero percent.

20. The at least one non-transitory memory storage media of claim 16, wherein:
 the local tax rate is zero percent.

* * * * *